United States Patent [19]

Katz et al.

[11] 4,276,315

[45] Jun. 30, 1981

[54] METHOD FOR DECAFFEINATING COFFEE

[75] Inventors: Saul N. Katz, Monsey, N.Y.; Martin Gottesman, Paramus, N.J.

[73] Assignee: General Foods Corporation, White Plains, N.Y.

[21] Appl. No.: 11,263

[22] Filed: Feb. 12, 1979

[51] Int. Cl.³ .................................................. A23F 5/20
[52] U.S. Cl. ..................................... 426/428; 426/427
[58] Field of Search ................................ 426/427, 428

[56] References Cited

U.S. PATENT DOCUMENTS

| | | | |
|---|---|---|---|
| 3,769,033 | 10/1973 | Panzer et al. | 426/428 |
| 3,806,619 | 4/1974 | Zosel | 426/427 X |
| 3,843,824 | 10/1974 | Roselius et al. | 426/427 X |
| 3,879,569 | 4/1975 | Vitzhum et al. | 426/427 |
| 4,081,563 | 3/1978 | Hudak et al. | 426/427 X |

FOREIGN PATENT DOCUMENTS

| | | | |
|---|---|---|---|
| 2005293 | 11/1972 | Fed. Rep. of Germany | 426/427 |
| 2357590 | 5/1975 | Fed. Rep. of Germany . | |
| 2638383 | 3/1977 | Fed. Rep. of Germany . | |
| 7207534 | 12/1972 | Netherlands | 426/427 |
| 206145 | 9/1924 | United Kingdom . | |
| 1057911 | 2/1967 | United Kingdom | 426/427 |

*Primary Examiner*—Joseph M. Golian
*Attorney, Agent, or Firm*—Thomas R. Savoie; Daniel J. Donovan

[57] ABSTRACT

Liquid propane, liquid butane or mixtures thereof at a temperature of from 30° C. to 95° C. is employed to selectively remove caffeine from moistened green coffee. The resulting decaffeinated coffee is then roasted and processed to ground or soluble coffee products which will possess the flavor and aroma of comparable non-decaffeinated coffee products.

7 Claims, No Drawings

METHOD FOR DECAFFEINATING COFFEE

DESCRIPTION

Background of the Invention

Decaffeination of vegetable materials such as coffee and tea has long been known to the art. Current commercial decaffeination processes all involve the use of chlorinated solvents, such as methylene chloride, which solvents are contacted either directly with the vegetable material or with an aqueous extract thereof. Typical processes for the decaffeination of green coffee beans are disclosed in U.S. Pat. Nos. 3,671,263 to Patel et al. and 2,309,092 to Berry et al.

As a result of the presence of chlorinated solvents in commercial green bean decaffeination processes, extensive stripping steps are required to reduce the level of solvent in the end product to a minimum. It is also a fact that current decaffeinated coffee products are currently perceived by many consumers as not being comparable in terms of flavor and aroma to non-decaffeinated coffee. Also since the use of chlorinated, or other halogenated compounds in food processing is becoming the subject of increased governmental regulation, it would be desirable to identify and employ a non-halogenated solvent for the decaffeination of coffee and other vegetable materials.

U.S. Pat. No. 3,879,569 to Vitzhum et al. describes a process for removing caffeine from moistened green coffee beans using liquid carbon dioxide at a pressure above the critical pressure for carbon dioxide of 73 atmospheres and also refers to a process for selectively removing carbon dioxide as a solvent. Both of these processes, however desirable they might be from the standpoint of toxicological safety and caffeine selectivity, suffer from the disadvantage of having to be operated at a pressure above 73 atmospheres, preferably at above 80 atmospheres in order to obtain the desired selectivity. Use of these high pressures necessitates the expenditure of large amounts of capital for equipment capable of withstanding such stress. It would be desirable to identify toxicologically safe solvents for caffeine that could be employed at pressures significantly below 80 atmospheres, that would, because of a low-boiling point, readily be removed from the decaffeinated coffee and that would be selective to caffeine, such that the amount of non-caffeine solids removed from the coffee are minimal and the aroma and flavor of the roasted decaffeinated coffee is comparable to the flavor and aroma of non-decaffeinated roasted coffee.

DISCLOSURE OF INVENTION

The present invention relates to selectively removing caffeine from vegetable material such as coffee or tea and more particularly to decaffeinating moistened whole or ground green coffee beans with liquefied propane, butane or mixtures thereof at a temperature of from 30° C. to 95° C., and preferably at a temperature on the order of 70° C. to 90° C.

Propane and butane, both of which are abundantly available and which are generally recognized as being toxicologically safe, are capable of being maintained in a liquid state up to 95° C. at pressures below 42 atm. The use of liquid propane or butane which boil at −42.17° C. and −0.5° C., respectively as a decaffeination solvent avoids the problem, inherent with the use of solvents such as methylene chloride, of solvent removal from the vegetable material after decaffeination. Chlorinated solvent removal, necessitated either by governmental regulations or for flavor purposes, usually requires prolonged treatment of the extracted vegetable material, generally by steam. Such thermal treatment can give rise to degradation of the vegetable material and/or of the solvent.

BEST MODE FOR CARRYING OUT THE INVENTION

The process of this invention as applied to green coffee is characterized by the steps of (1) initially premoistening the green coffee material; (2) caffeine extraction by direct contact of the liquid propane and/or butane and the moistened coffee; and (3) drying and/or roasting of the decaffeinated green coffee.

The premoistening operation involves uniformly incorporating water into the green or raw coffee material. This water, as will be recognized by those skilled in the art, is for the purpose of swelling the coffee and making the caffeine available for extraction. The type of premoistening employed will depend on the quantity of green beans to be extracted, and the type of equipment employed for premoistening. When extracting small batches of green beans, heat losses are generally high and it has been found beans can be steamed within 30 minutes to yield bean moisture contents of 40 to 50 percent by weight moisture in the bean. Where large commercial batches of green beans are premoistened, longer periods of time are generally necessary. Premoistening can be accomplished by either adding water and mixing the beans, by using humidified air or other gases, or by employing steam. The particular method employed for premoistening the bean is not critical, so long as a uniform and relatively even penetration of water is obtained throughout the bean. Beans may be premoistened to any desired degree; however, the greater the moisture content of the premoistened bean, the more rapid is the caffeine extraction. Thus, while moisture contents of about 15 to 60% may be employed, we prefer to extract green beans having a moisture content greater than 30%.

Extraction of the green coffee can be either by batch, semi-continuous or continuous operation. For most commercial applications, it is seen that a continuous system would be most practical. The major controlling factors are the desired decaffeination level, the temperature during decaffeination and the amount of propane and/or butane passed through the green coffee. Extraction is accomplished by contacting the green coffee with liquid propane and/or butane at a temperature between about 30° C. and 95° C. A minimum temperature of 30° C. has been found desirable to obtain a suitable rate of decaffeination. Temperatures above 95° C. should be avoided in order to protect the moistened coffee from the effects of thermal degradation. It should also be noted that propane is no longer in a liquid state above its critical temperature of 96.8° C. The critical temperature of butane is 153° C. The pressure employed during extraction need only be great enough to maintain the propane and/or butane as a liquid. Thus at a temperature of 30° C., a minimum pressure of about 11 and 3 atmospheres would be required for propane and butane, respectively, while at 95° C. minimum pressures of about 41 and 14 atmospheres would be required. The critical pressure of propane is 42 atmospheres, that of butane is 36 atmospheres.

The weight ratio of liquid propane to green coffee employed during extraction is controlled to insure relatively rapid removal of caffeine, typically to achieve 98% caffeine removal in less than about eight hours, while maintaining the flow of liquid propane and/or butane through the beans at an efficient rate. As the caffeine capacity of liquid propane and butane is relatively low, compared to such liquid solvents as methylene chloride, it will be necessary to pass considerable amounts of these liquefied gases through the green coffee to effect a significant degree of decaffeination. Preferably the liquid propane and/or butane will be passed through the green coffee in an amount of from 20 to 200 kgs. solvent/kg. of green coffee/hour and the flow rate of liquid propane and/or butane through the green coffee will be from about 0.5 to 5 cm/sec.

If desired, the liquid propane and/or butane may be augmented with from about 5% to 20% (by weight) of a low-molecular weight alcohol such as methanol, ethanol and isopropanol. The alcohol may be added to the system either in the prewetting step where the coffee would be contacted with an alcohol-water solution or mixed with the liquid propane and/or butane. Surprisingly, it has been found that this small amount of alcohol greatly increases the partition coefficient of the liquid propane and/or butane solvent such that the amount of solvent passed through the coffee can be reduced by amounts up to 50% or more.

After the desired degree of decaffeination has been achieved, the green coffee is separated from the liquid propane and/or butane and subjected to ambient pressure, vacuum, and/or humidified gas, such as steam, in order to flash or strip any residual propane or butane from the coffee. If the coffee were to contain any alcohol residue, steam stripping of at least a portion of this residue could be effected. Fresh liquid propane and/or butane could be employed to remove at least a portion of any alcohol residue either before or after the green coffee is removed from the pressure vessel in which decaffeination occurs.

After the desired residual solvent level in the green coffee has been reached, the beans are dried by any conventional means to prevent degradation during subsequent storage. The particular drying step employed should be such to minimize the heat effect on the decaffeinated moist green bean. Alternatively, the drying step may be employed to both strip residual solvent and to dry. As will be apparent to those skilled in the art, if the decaffeinated beans are to be immediately roasted, this drying step can be eliminated.

The caffeine removed from the green coffee by the liquid propane and/or solvent is desirably recovered as a valuable by-product and the caffeine-free propane and/or butane is reclaimed for reuse. Caffeine recovery can be effected by any conventional technique. Liquid-liquid extraction by passing the caffeine-laden liquid propane and/or butane in counter-current relation with a water stream, adsorption of the caffeine from the liquid gas stream by means of a suitable adsorbent such as activated charcoal, and evaporation of the liquid propane and/or butane in order to precipitate caffeine solids are all effective recovery techniques. Caffeine recovery by evaporation of the liquid propane and/or butane could be used advantageously in manufacturing sites which require refrigeration, thereby reducing total energy requirements.

This invention is further illustrated but not limited by the following examples.

EXAMPLE 1

0.45 kilograms of green Colombian coffee beans were moisturized by steam to a 50% (by weight) moisture level. These beans were then placed in a pressure vessel and liquid propane at a temperature of 80° C. and a pressure of 300 atmospheres was passed through the beans at a rate of 38 kgs. of propane/kg. of beans/hour. The propane was recirculated from the beans through a 3000 ml. vessel filled with activated charcoal and back to the bean containing vessel. The amount of activated charcoal employed was found to adsorb essentially all of the caffeine from the liquid propane stream. After 16 hours, the caffeine level (by weight) in the bean was found to be reduced by 97.2%.

EXAMPLE 2

Using the procedure set forth in Example 1 employing supercritical propane at 110° C. and a flow rate of 35 kgs. of propane per kg. of beans per hour, a caffeine reduction of 97.3% was effected in 16 hours.

EXAMPLE 3

As shown in the following Table, the use of liquid propane at low pressures is equally effective to decaffeinate green coffee beans. In this set of experiments, two kilograms of green Colombian coffee beans were moisturized, placed in a pressure vessel (10 mm. internal dia., 91.4 cm. in height) and decaffeinated by means of recirculating stream of liquid propane flowing at a rate of 60 kgs./kg. beans/hour and a velocity through the bean vessel of about 1.25 cm./sec. The propane was freed of caffeine by passage through a vessel (10 mm. internal dia., 45.7 cm. high) containing 625 grams of activated charcoal.

TABLE

| Pressure (atm.) | Temp. (°C.) | % Moisture (by wt.) | Time (hrs.) | % Decaffeination (by wt.) |
| --- | --- | --- | --- | --- |
| 200 | 80 | 50 | 10 | 80 |
| 200 | 80 | 35 | 14 | 82 |
| 40 | 80 | 35 | 10 | 80 |
| 40 | 70 | 35 | 10 | 73 |

The decaffeinated beans from Example 3 were roasted and brewed and the flavor of the beverage was considered to be of good quality and comparable to a control beverage prepared from beans which had been decaffeinated by means of supercritical $CO_2$ at 80° C. and 200 atmospheres.

EXAMPLE 4

Employing the experimental apparatus of Example 3, two kilograms of green Colombian beans moisturized to 35% by weight are decaffeinated at 80° C. and 15 atmospheres by means of a recirculating stream of liquid butane flowing at a rate of 60 kg./kgs. bean/hour and velocity through the bean vessel of 0.9 cm./sec. The beans are decaffeinated to at least 80% by weight in ten hours without incurring adverse flavor effects.

Having thus described the invention, what is claimed is:

1. A process for decaffeinating moistened green coffee by extracting the coffee with liquid solvent selected from the group consisting of propane, butane and mixtures thereof at a temperature of from 30° to 95° C. and at a pressure which is below the critical pressure of the liquid solvent.

2. The process of claim 1 wherein the temperature is between 70° C. and 90° C.

3. The process of claim 2 wherein the moisture content of the green coffee is between 30 and 60% by weight.

4. The method of claim 1 wherein the liquid solvent gas contains from 5% to 20% by weight of a low molecular weight alcohol.

5. The method of claim 4 wherein the alcohol is added to the extraction system by being added to water used to moisturize the green coffee.

6. The method of claim 4 or 5 wherein the alcohol is selected from the group consisting of methanol, ethanol and isopropanol.

7. The method of claim 1 or 4 wherein caffeine is separated from the liquid solvent by evaporation of the liquid.

* * * * *